(12) United States Patent
Cai

(10) Patent No.: US 8,059,566 B1
(45) Date of Patent: Nov. 15, 2011

(54) VOICE RECOGNITION PUSH TO MESSAGE (PTM)

(75) Inventor: Zheng Cai, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 685 days.

(21) Appl. No.: 11/453,544

(22) Filed: Jun. 15, 2006

(51) Int. Cl.
*H04L 12/16* (2006.01)

(52) U.S. Cl. ........ 370/271; 370/259; 370/352; 370/410; 455/414.1; 455/414.3

(58) Field of Classification Search .................. 370/352, 370/410, 259, 271, 546; 455/412.1, 417, 455/414.1, 414.3
See application file for complete search history.

(56) References Cited

U.S. PATENT DOCUMENTS

| | | | |
|---|---|---|---|
| 6,366,771 B1 * | 4/2002 | Angle et al. | 455/414.1 |
| 6,876,728 B2 * | 4/2005 | Kredo et al. | 379/88.17 |
| 7,116,976 B2 * | 10/2006 | Thomas et al. | 455/417 |
| 7,212,614 B1 * | 5/2007 | Burg et al | 379/88.18 |
| 2002/0057765 A1 * | 5/2002 | Hyziak et al. | 379/52 |
| 2003/0002633 A1 * | 1/2003 | Kredo et al. | 379/88.08 |
| 2003/0028380 A1 * | 2/2003 | Freeland et al. | 704/260 |
| 2005/0101339 A1 * | 5/2005 | Bishop et al. | 455/521 |
| 2005/0124324 A1 * | 6/2005 | Thomas et al. | 455/412.1 |
| 2006/0080097 A1 * | 4/2006 | Hoffmann | 704/235 |
| 2007/0202925 A1 * | 8/2007 | Beith | 455/567 |

FOREIGN PATENT DOCUMENTS

WO WO 2004084184 A1 * 9/2004

* cited by examiner

*Primary Examiner* — Dang Ton
*Assistant Examiner* — Robert M Morlan

(57) ABSTRACT

A system and method for using the packet data service of a dispatch wireless communication network converts a subscriber's voice to a text message. The system employs offline conversion and verification of the converted text message prior to transmitting over the Internet via the packet data network of the dispatch system. The voice conversion to text is implemented within the mobile subscriber handset and thus requires no modification of the dispatch network.

3 Claims, 3 Drawing Sheets

VOICE RECOGNITION PUSH TO MESSAGE (PTM)

CROSS REFERENCE TO RELATED APPLICATION

This application is related to U.S. patent application Ser. No. 10/840,383 filed May 7, 2004 and published as Pub. No. 2005/0250550 on Nov. 10, 2005.

FIELD OF THE INVENTION

The present invention relates to a system and method for performing text messaging in a dispatch mode of a wireless communication system.

BACKGROUND OF THE INVENTION

Some wireless service providers allow for both "interconnect" and "dispatch" calls to be placed over a wireless network. Interconnect capability is traditionally referred to as cellular communications offering full duplex voice transmission via the use of dial-up calling. The dispatch capability is often referred to as a "walkie-talkie" communication using half duplex voice transmission where only one party is capable of talking at any one time. Sprint Nextel Inc. is a leading provider of such dual capability service, having subscriber units adapted for making both interconnect voice and dispatch voice calls. In a network such as Sprint Nextel's, the walkie-talkie feature is operated by a user selecting a number within an established "fleet" of subscribers, and having the user press a dispatch button to initiate the communication. The mobile station/subscriber unit radio sends a signal including subscriber identification information, as well as the intended target number, to a cell site base station. A mobile station can be any type of wireless communication device including wireless telephones, wireless Personal Digital Assistants (PDA), wireless pagers, or any device which performs one or more of these functions. Subsequently, a signal is sent to a dispatch application processor (DAP) through a frame relay switch called a Metro Packet Switch. The DAP identifies the target radio and signal with a distinctive tone to join the call.

On the other hand, an interconnect voice call is initiated when a user dials a telephone number and presses the "send" key on the subscriber unit. The telephone number, along with other data signals, passes over a radio channel to the base station which, in turn, relays the signals and the telephone number to main switching equipment. From the switching equipment, a message is passed to the Public Switched Telephone Network (PSTN) to connect with the target telephone number. When the called number answers, a "traffic channel" is assigned to the call.

The capabilities of the dispatch portion of the system includes the sending of computer-type packet data as well as the above discussed dispatch data. A Mobile Data gateway (MDG) provides access to the Internet during packet data operation.

SUMMARY OF THE INVENTION

The present invention expands dispatch operation to include the use of the packet data network for transmitting IM (Instant Messaging) text from and to mobile stations/personal computers through voice recognition conversion. A user is enabled to use a Push to Message button on the handset or mobile station prior to using Push to Talk so that the spoken words will be converted to text and delivered by way of the wireless packet data network to the recipient. This effectively provides Instant messaging with mobility and allows receipt and display of a message even when the recipient's handset is on the vibrate mode.

DETAILED DESCRIPTION OF THE DRAWINGS

Figure 1:
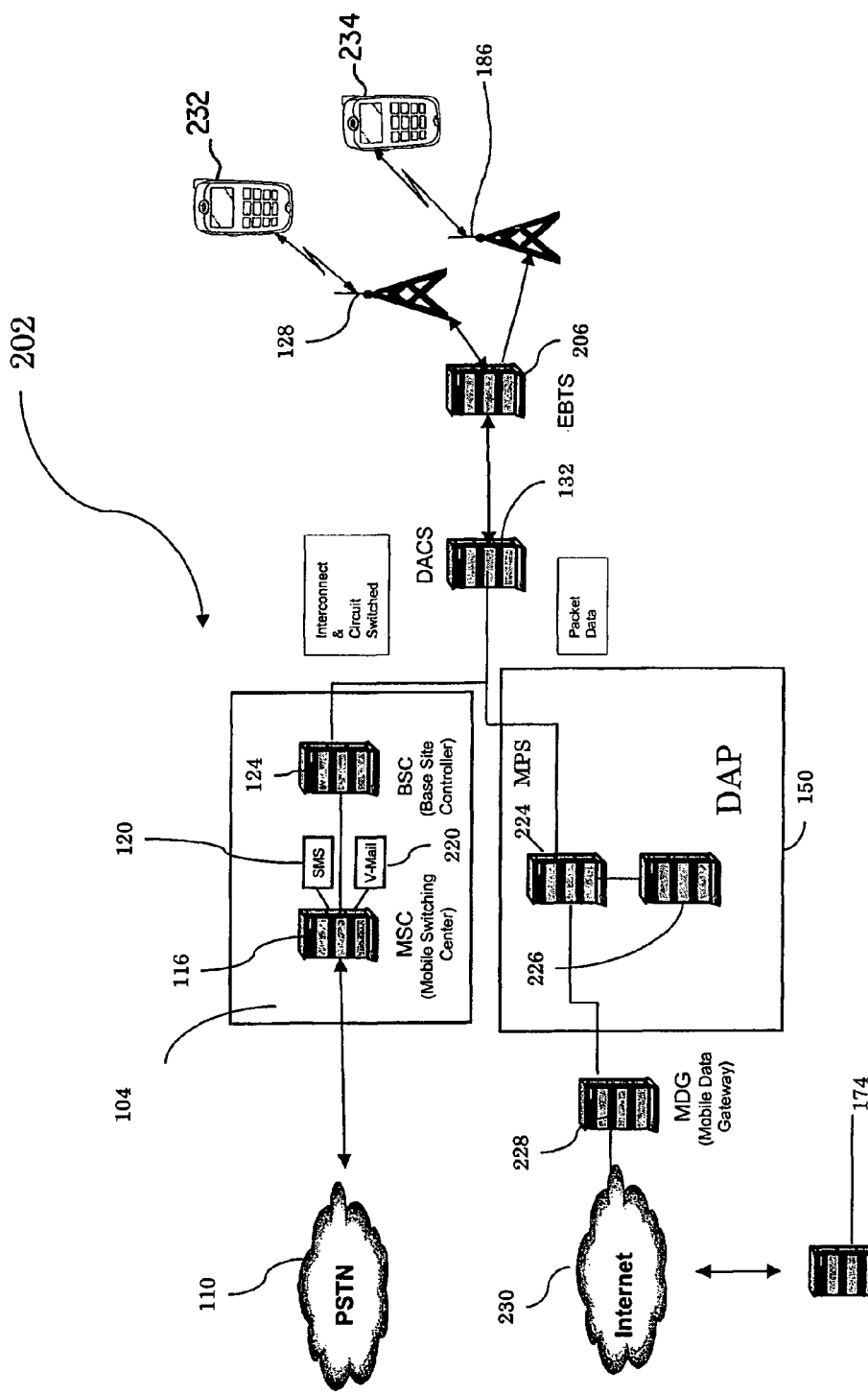
FIG. 1 illustrates a block diagram of an exemplary communication system using for use with the voice recognition push to talk messaging of the present invention.

The wireless network of FIG. 1 is based on an iDEN communication system such as that owned and operated by Sprint Nextel, however the network 202 can be any type of wireless communication system that functions with TDMA, CDMA, GSM, D-AMPS, or any other wireless protocol. The wireless network 202 includes at least one wireless antenna 128,186, an enhanced base transceiver system (EBTS) 206, a Digital Access Cross-connect Switch (DACS) 132, an interconnect and circuit-switched processing portion 104, and a packet data processing portion 150.

The antennas 128,186 and EBTS 206 transmit and receive wireless communications with mobile stations 232, 234 within the wireless network 202. The EBTS 206 provides communications from a mobile station 232, 234 over antenna 128,186 to DACS 132. Depending upon the type of communications, DACS 132 routes the communications to either the interconnect and circuit-switched processing portion 104 or the packet data processing portion 150. Interconnect communication is what is conventionally considered "cellular communications" and is handled in a conventional manner by interconnect and circuit-switched processing portion 104. Specifically, interconnect and circuit-switched processing portion 104 includes a Base Site Controller (BSC) 124 and a Mobile Switching Center (MSC) 116. MSC 116 can have a connection to a Short Message Service (SMS) processor 120 and a voicemail processor 220. MSC 116 interfaces with the PSTN 110.

Packet Data Processing Portion 150 includes a Metro Packet Switch (MPS) 224 and a Dispatch Application Processor (DAP) 226. It is coupled to the Internet 230 via Mobile Data Gateway (MDG) 228. The packet data processing portion 150 processes both computer-type packet data and dispatch call data. A dispatch call is commonly known as a walkie-talkie type of call such as Sprint Nextel's service identified by the trade names Push-To-Talk or Direct Connect. For purposes of the present invention the IM server 174 is shown in communication with internet 230.

Figure 2:
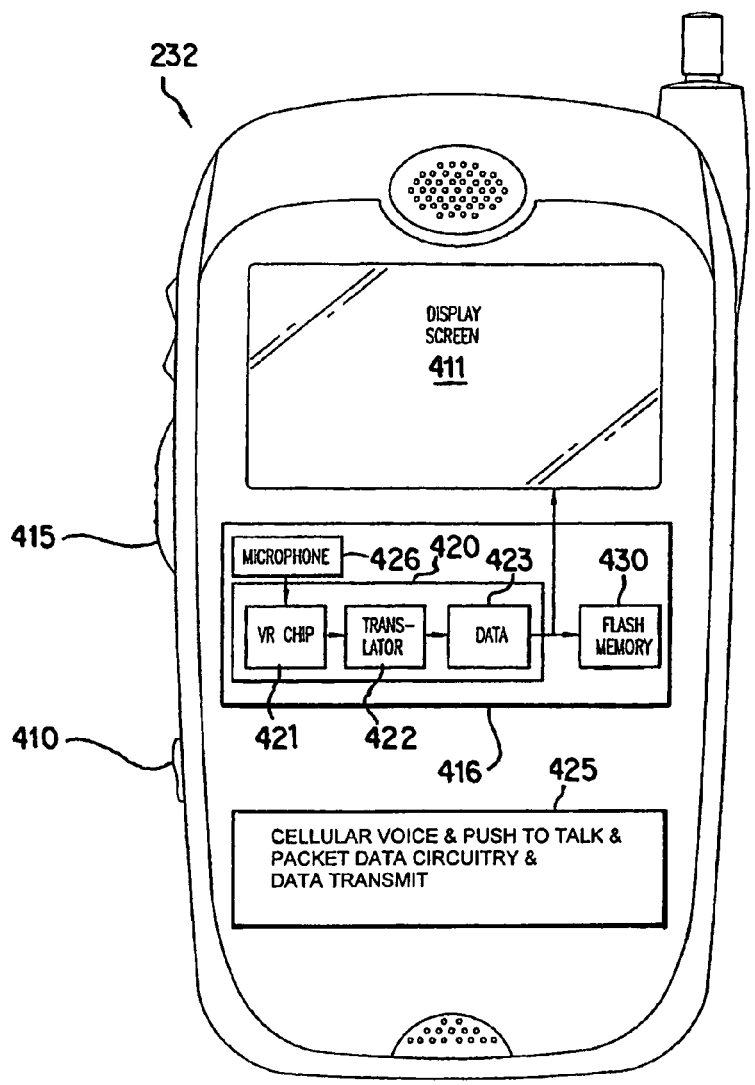
FIG. 2 is a schematic block diagram of a mobile subscriber unit having voice to text circuitry for operation according to the present invention.

The voice recognition module 416 of FIG. 2 is integrated into a mobile subscriber unit such as a cellular handset 232 of FIG. 1, which also contains Instant Messaging (IM) software. A display screen 411 corresponds to a conventional cell phone handset display. Modern subscriber units are able to provide multiple functions. The voice and Direct Connect or dispatch features are available in the unit 232 through the known Cellular Voice and Push-to-Talk circuitry 425.

A Push-to-Message (PTM) switch 410 is used to select the PTM service. The pressing of the PTT switch 415 calls a selected IM party and the voice recognition module 420, when activated, directs the output of the microphone 426 to a voice recorder chip 421 of a voice recognition system 420. The recorder chip 421 outputs information to translator 422 to provide data 423 which is then stored in flash memory 430. Once the user approves the recorded content, it is sent to the IM recipient through EBTS 206, DACS 132, MPS 224, MDG 228 and out to the Internet.

Figure 3:
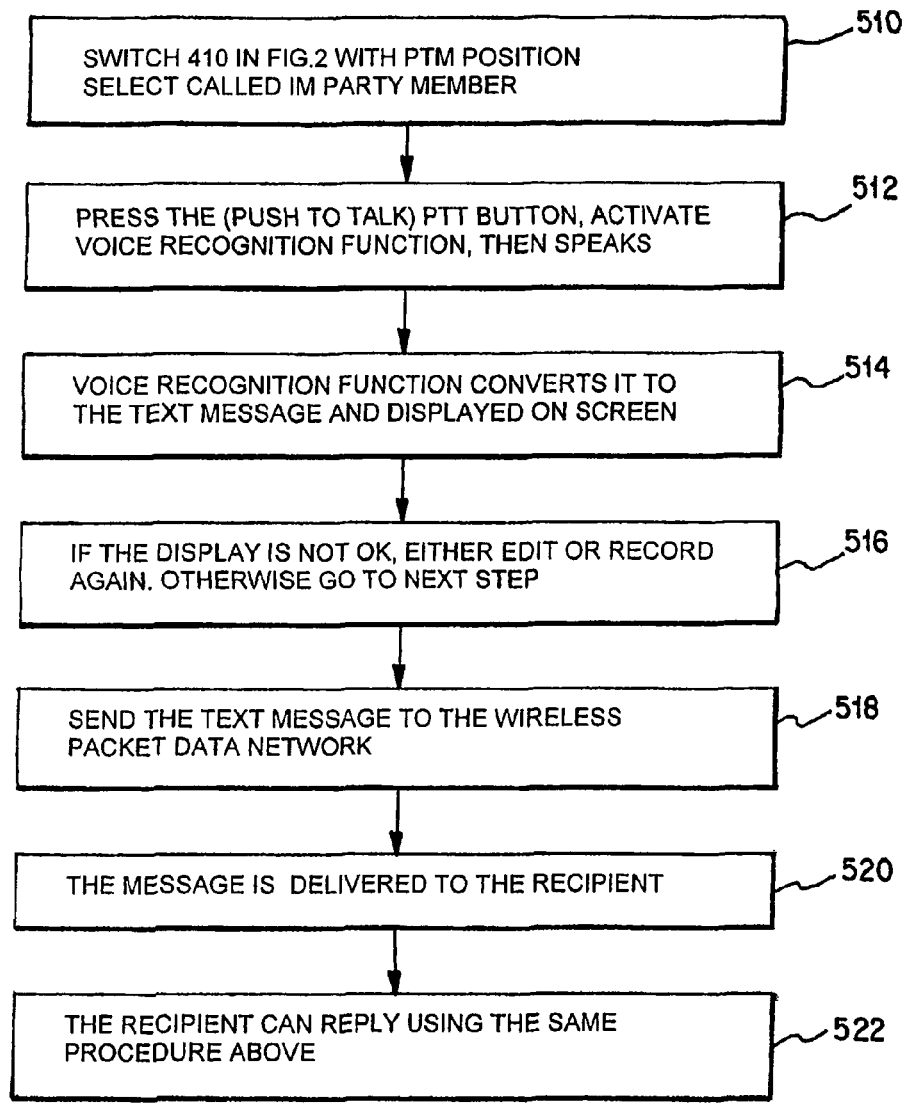
FIG. 3 is a flow chart of the voice to text messaging operation according to the present invention.

The operating process for sending a text message is detailed in the flow chart of FIG. 3 which begins at step 510 with the selection of PTM on switch 410, followed by selection of an IM party member. Then, at step 512, when the PTT button is pressed, the voice activation follows and the user speaks the message to be eventually delivered by text.

Once the voice recognition circuitry 416 converts the voice message to text, in the step 514 the translated message is displayed at the screen 411. If the displayed text message is not satisfactory to the user then the message can be edited or rerecorded by going back to step 512. When the displayed message if acceptable, it is transmitted through the Packet data processing network 150 (Step 518) and delivered to the previously selected recipient (Step 520). The message is displayed on a corresponding screen of the recipient. If the recipient has a similarly equipped subscriber unit a response can be made using the same procedure as described above.

If the Push to Message switch 410 is not operated, the Push to Talk (Dispatch) of the subscriber units functions in the normal manner for voice communication.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method for wirelessly transmitting text messages via a dispatch network, comprising:

receiving, at a dispatch-enabled communication device, a user's input via a first user-operated switch to enable a push-to-message function to send a voice input received via a microphone of the communication device as text data in a text message through the dispatch network; the function comprising:

initiating operation of the microphone;

receiving a voice input via the microphone, converting the received voice input received via the microphone into the text data;

displaying the text data to the user; and displaying a list of parties able to be contacted via the dispatch network if the user indicates that the displayed text data is satisfactory;

receiving, at the dispatch-enabled communication device, user's input via a second user-operated switch to transmit the text data in the text message to at least one party selected by the user from the list of parties; and transmitting, by the dispatch-enabled communication device, in response to the user's input received via the second user-operated switch, the text message over the dispatch network to the at least one party selected by the user from the list of parties, wherein, if the push-to-message function to send a voice input received via a microphone from the user as a text message through the dispatch network is disabled, the dispatch-enabled communication device transmits the received voice input received via the microphone as a voice message through the dispatch network, in response to a user's input received via the second user operated switch.

2. The method according to claim 1, further including recording the received voice input.

3. The method according to claim 1, further including storing said text message, after determining whether said displayed text data is satisfactory to the user.

* * * * *